Patented Sept. 23, 1930

1,776,668

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY

PROCESS FOR MAKING INACTIVE MENTHOL

No Drawing. Original application filed June 30, 1927, Serial No. 202,739, and in Germany February 15, 1927. Divided and this application filed September 20, 1928. Serial No. 307,332.

This is a process for the production of inactive menthol, new isomer of inactive menthol and making the same, being a divisional application of application Serial No. 202,739 filed June 30th, 1927.

According to this process inactive neomenthol is transformed to inactive menthol. This transformation may be effected by the action of mentholates of the alkali forming metals at temperatures above 100 degrees centigrade, the inactive neomenthol being employed by itself or in admixture with other isomers of inactive menthol and separating the crude inactive menthol from the resulting mixture by physical methods for instance by freezing-out or fractional distillation, purifying the crude inactive menthol by way of its esters as described in U. S. Patent No. 1,672,346, and transforming the residual isomers anew.

*Example 1.*—300 kilograms inactive neomenthol and 9 kilograms of metallic sodium are dissolved in the warm and the mixture with the resulting sodium mentholates is heated at 180 degrees centigrade for about 24 hours. The resulting menthols mixture is thereupon distilled off with steam or also shaken with water until the alkali reaction is no longer in evidence and the crude inactive menthol is separated from the equilibrium mixture obtained by freezing or fractional distillation or both and is further purified by way of the crystallized esters. Completely pure inactive menthol of melting point 34–36 degrees centigrade is obtained. The isomeric menthols resulting from the separation and purification of the inactive menthol are transformed afresh.

*Example 2.*—In a mixture of:
100 kilograms of inactive neomenthol, melting point 51 degrees centigrade,
100 kilograms of inactive neo-isomenthol, melting point 12–14 degrees centigrade,
100 kilograms of inactive isomenthol, melting point 53 degrees centigrade,
9 kilograms of metallic sodium are dissolved in the warm and the mixture with the resulting sodium mentholates is heated at 180 degrees centigrade for about 24 hours. The resulting menthols mixture is thereupon distilled off with steam or also shaken with water until the alkali reaction is no longer in evidence and the crude inactive menthol is separated from the equilibrium mixture obtained by freezing or fractional distillation or both and is further purified by way of the crystallized esters. Completely pure inactive menthol of melting point 34–36 degrees centigrade is obtained. The isomeric menthols resulting from the separation and purification of the inactive menthol are transformed afresh.

We claim:

1. The process for manufacturing inactive menthol, the racemate of natural menthol, which consists in heating inactive neomenthol with mentholates of the alkali forming metals and separating from the reaction product crude inactive menthol by physical methods.

2. The process for manufacturing inactive menthol, the racemate of natural menthol, which consists in heating inactive neomenthol admixed with other isomers of inactive menthol, with mentholates of the alkali forming metals and separating from the reaction product crude inactive menthol by physical methods.

3. The process for manufacturing inactive menthol, the racemate of natural menthol, which consists in heating inactive neomenthol with mentholates of the alkali forming metals and separating from the reaction product crude inactive menthol by fractional distillation.

4. The process of manufacturing inactive menthol, the racemate of natural menthol, which consists in heating inactive neomenthol with mentholates of the alkali forming metals, separating crude inactive menthol from the reaction product, and purifying said crude inactive menthol.

5. The process for manufacturing inactive menthol, the racemate of natural menthol, which consists in heating inactive neomenthol with mentholates of the alkali forming metals and separating from the reaction product crude inactive menthol by fractional crystallization.

In testimony whereof we affix our signatures.

KARL SCHÖLLKOPF.
ARTHUR SERINI.